No. 709,128. Patented Sept. 16, 1902.
A. P. WATERMAN & G. H. E. BERTHOLD.
NUMBERING MACHINE.
(Application filed Aug. 2, 1900.)
(No Model.) 2 Sheets—Sheet 2.
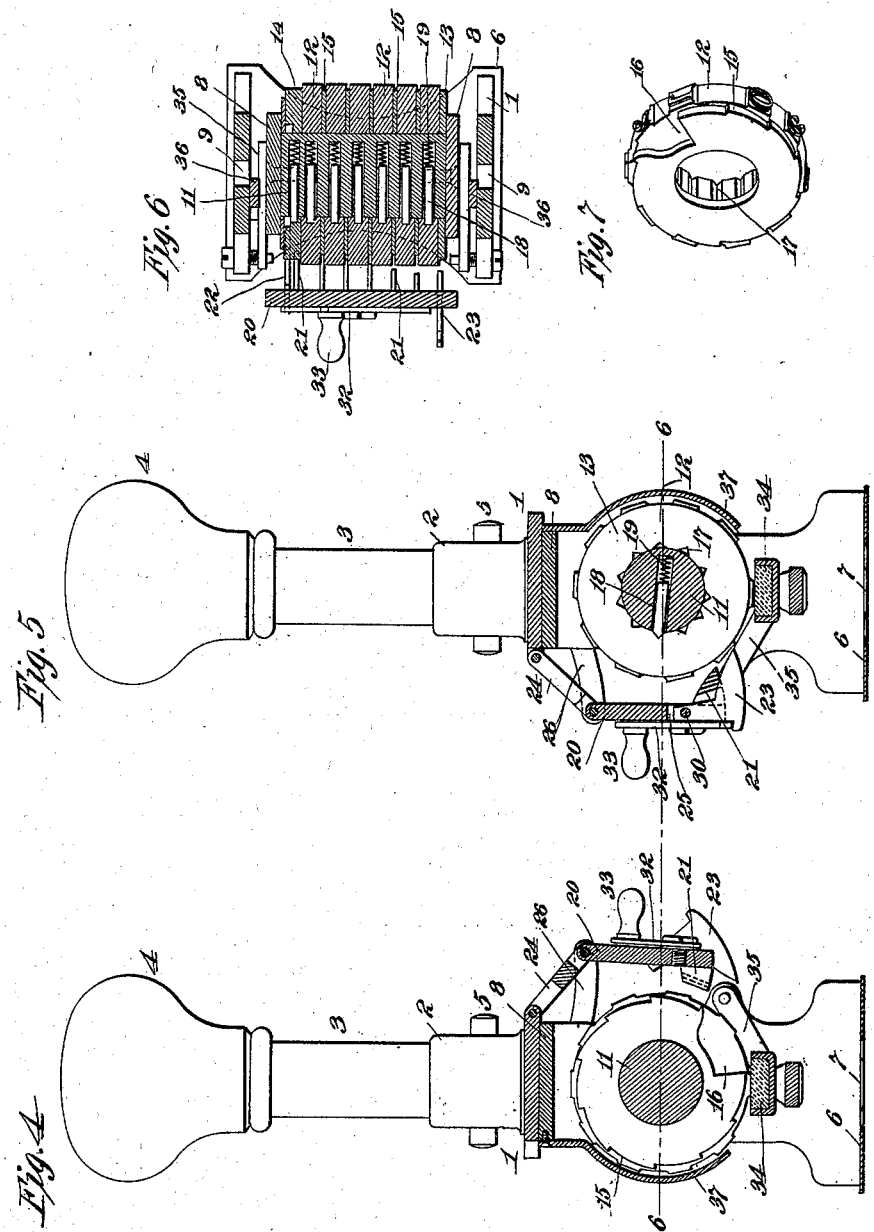
Witnesses: Inventors

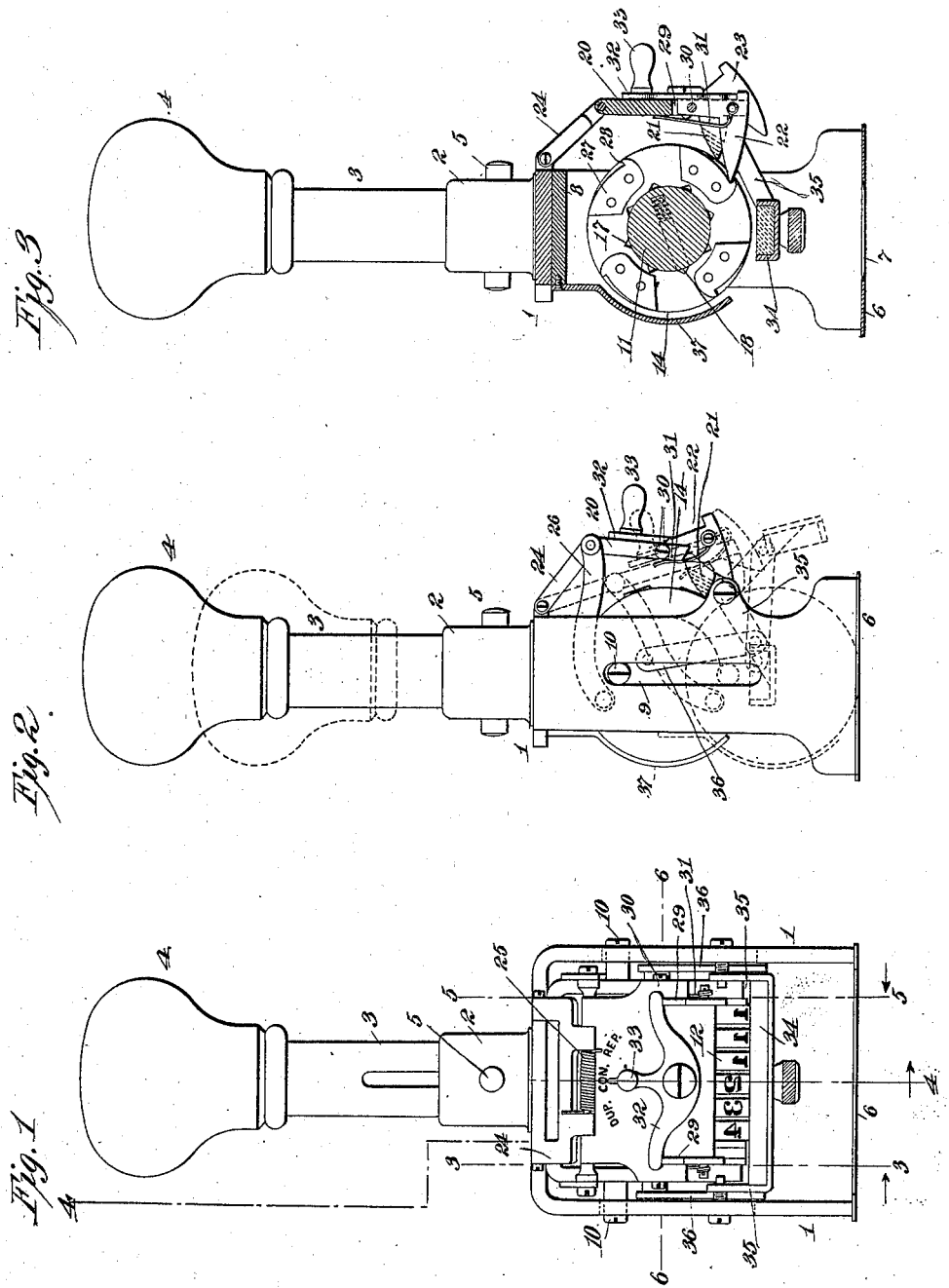

UNITED STATES PATENT OFFICE.

ALBERT P. WATERMAN, OF ORANGE, AND GEORGE H. E. BERTHOLD, OF NEWARK, NEW JERSEY, ASSIGNORS TO THE EDISON PHONOGRAPH WORKS, OF ORANGE, NEW JERSEY, A CORPORATION OF NEW JERSEY.

NUMBERING-MACHINE.

SPECIFICATION forming part of Letters Patent No. 709,128, dated September 16, 1902.

Application filed August 2, 1900. Serial No. 25,660. (No model.)

*To all whom it may concern:*

Be it known that we, ALBERT P. WATERMAN, of Orange, and GEORGE H. E. BERTHOLD, of Newark, in the county of Essex and State of New Jersey, citizens of the United States, have invented a certain new and useful Improvement in Numbering-Machines, of which the following is a description.

Our invention relates to improvements in hand numbering-machines of the type wherein the numeral-carrying wheels or disks may be operated either consecutively, as for the numbering of consecutive pages, or in duplicate, as for the numbering of checks and the stubs therefor. Usually numbering-machines of this type are also capable of being operated to repeat a number indefinitely, as for the marking of tags for identifying goods or other commodities by particular numbers.

The object of our invention is to provide a numbering-machine of the type referred to, which while being highly efficient in operation is at the same time of very simple construction, and hence can be made cheaply and put on the market at a low cost. In effecting this object the invention consists generally in combining with a series of number-carrying disks a novel external manually-adjustable arrangement of feed-pawls whereby the desired operations of the number disks or wheels may be effected.

In order that the invention may be better understood, attention is directed to the accompanying drawings, forming part of this specification, and in which—

Figure 1 is an elevation of the improved numbering-machine, viewing the same from the rear; Fig. 2, a side view of the same, showing in dotted lines the position of the parts when the number wheels or disks have been forced downward to effect the printing; Fig. 3, a section on the line 3 3 of Fig. 1, showing particularly the construction of the alternate deep-toothed disk for use in effecting a duplicate feed of the number-wheels; Fig. 4, a section on the line 4 4 of Fig. 1, showing the construction of one of the ordinary number wheels or disks; Fig. 5, a section on the line 5 5 of Fig. 1, looking in the opposite direction, illustrating in section the construction of one of the number wheels or disks; Fig. 6, a horizontal section on the line 6 6 of Fig. 1, and Fig. 7 a perspective view of one of the number-carrying disks or wheels.

In all of the above views corresponding parts are represented by the same numerals of reference.

1 1 represent the side plates of the frame, formed with a bearing-sleeve 2 at their upper ends, in which reprocates the plunger 3, operated by a handle 4. The plunger 3, as is common, is normally spring-pressed upward. The usual pin 5 may be employed to lock the plunger in its lowermost position when desired.

6 represents the thin bottom plate, cut away at its central part at 7, (see Figs. 3, 4, and 5,) through which cut-away portion the impression from the number wheels or disks is effected.

The plunger 3 carries a generally U-shaped frame 8 at its lower end, which frame reciprocates between the side plates 1 1. For this purpose the side plates 1 are each provided with vertical guides 9, and working in each of said guides is a pin 10, carried by the frame 8.

Rigidly secured between the side members of the frame 8 is a stationary shaft or barrel 11, and rotatably mounted on said barrel are the several number disks or wheels 12, together with a smooth disk 13, which comes into play when it is desired to repeat a number indefinitely, and an alternate deep-toothed disk 14, by means of which the duplicate numbering operation may be effected. Each of the number wheels or disks, as shown in Fig. 7, consists of an annulus carrying peripherally the representation of the nine digits and the cipher, a double space being formed between the first numeral and the cipher, as is common. Each of said disks also carries at its side a toothed disk 15, which may be either separate from the number-disk and secured thereto or be integral therewith, each of said toothed disks being provided with the usual deep tooth 16 for effecting the carrying operation to disks of higher order, as is common in devices of this and analogous types.

Interiorly each disk is formed with a series of teeth 17, and coöperating with the teeth of each number-disk is a pawl 18, mounted in a recess in the barrel or shaft 11 and impelled outwardly by a spring 19, whereby the several number-disks will be automatically and frictionally locked in the different positions to which they may be moved in the operation. In Fig. 6 we illustrate six of the number disks or wheels 12, arranged side by side, with the stationary smooth disk 13 at one side of the series and the alternate deep-toothed disk 14 at the other side. Coöperating with all of these disks and number-wheels are a series of pawls which are sustained by a plate 20. The plate 20 carries a series of pawls 21, which are of successively - increasing depth and which coöperate with the toothed plates 15 of the several number-disks to operate said disks in the usual way. These pawls may be conveniently cast with the plate 20. Said plate also carries two movable teeth or pawls 22 and 23, respectively, which coöperate with the alternate deep-toothed disk 14 and the smooth stationary disk 13 to provide for a duplicate feeding operation or for throwing the feed-pawls out of operation, as the case may be, when a repetition of a number requires to be printed. The construction, arrangement, and operation of these pawls or fingers 22 and 23 will be presently referred to. The plate 20 is connected to the upper part of the main frame 1 by means of a pivoted link 24, the pivot between said link and plate being encircled by a spring 25, (see Fig. 1,) by means of which the plate 20 will be elastically impelled toward the number-disks to hold the several pawls in their proper operative relations thereto. The pivot between the link 24 and the plate 20 is also connected at each side to the main frame 1 by links 26, so as to positively swing the link 24 during each operation from the position shown in full lines, Fig. 2, to the position shown in dotted lines in said figure. As stated, the spring finger or pawl 22 coöperates with the alternate deep-toothed disk 15. The said alternate deep - toothed disk is formed of a ring carrying at one side a series of plates 27, each formed with a tooth 28 and having a series of spaces between said plates into which the finger or pawl 22 may drop. The disk 13, as before stated, is a stationary disk with a plain periphery. Each of the fingers or pawls 22 and 23 is pivoted in recesses 29 (see Fig. 1) in the plate 20 on pivot-screws 30, and each of said fingers or pawls is impelled normally away from the number wheels or disks by means of a spring 31. Normally, therefore, the spring fingers or pawls 22 and 23 will be forced into their retracted positions to allow the feed-pawls 21 to engage the number-disks to feed the latter with a consecutive operation, as is common. By moving the spring finger or pawl 22 or 23, as the case may be, inwardly and by locking the same in such position a duplicate or a repeat operation will be effected, as will be explained. For the purpose of operating either the finger or pawl 22 or 23 to effect these operations we employ a lever 32, mounted on the rear surface of the plate 20, the extremities of said lever coöperating alternately with the fingers or pawls 22 and 23 to lock either of said pawls in its operative position. When the lever 32 is in a horizontal position, as shown in Fig. 4, both of the fingers or pawls 22 and 23 will be retracted by their springs 31. When the lever 32 is tilted to one side or the other, one of said pawls will be moved inwardly, as shown in Fig. 3, allowing the other to be still maintained in the retracted position. The lever 32 may be operated by a finger-piece 33, which may coöperate with a scale or index representing the operations which it may be desired to effect. The number wheels or disks are inked in any suitable way, but preferably by an automatic inking-pad 34, carried on arms 35, pivoted to the side plates 1, and connected by links 36 with the frame 8, so that as the frame 8 moves downward the inking-pad 34 will be swung out of the way, as shown in dotted lines, Fig. 2. The front side of the number wheels or disks may be conveniently protected by a shield 37, the rear side of said disks being concealed by the plate 20 and link 24.

The operation of our improved numbering-machine will be as follows: Assuming the device to be used in effecting a consecutive numbering operation, the lever 32 will be maintained in its normal horizontal position to allow both of the spring fingers or pawls 22 and 23 to be retracted. Upon depressing the handle 4 the frame 8, carrying the number wheels or disks, will be forced downward, effecting an impression on the paper or other surface through the opening 7 in the plate 6. Upon the upward movement of these parts the feed-pawls 21, engaging the toothed disks 15 of any one or more of the number wheels or disks, will rotate said number wheels or disks with a step-by-step movement. The pawls 21 will obviously be engaged with the toothed disks 15 of the several number wheels or disks by reason of the spring 25, which impels the pawl-carrying plate 20 toward the number-wheels. When it is desired to effect a continuous repetition of a number, the handle 33 is operated to move the lever 32 into position to depress the finger or pawl 23. This finger or pawl engages with the smooth stationary disk 13 and rides on its periphery, elevating all of the feed-pawls 21 from the number wheels or disks, so that the movement of the frame 8 in effecting the printing will not effect a feed of the number-wheels. In consequence the presented number will be repeated indefinitely. In effecting a duplicate printing operation the lever 32 is moved to the other extreme, depressing the finger 22 and causing the latter to engage with the alternate deep-toothed disk 15. Whenever the finger or pawl 22 drops into the space between the plates 27 on said disk, the feed-pawls 21 will be permitted to operate to effect a feed movement of the number wheels or disks; but at the next feed movement the finger or pawl 22 will ride upon one of the plates 27, so as to retract the feed-pawls 21 from their operative relation to the number-wheels, so that on the next feed movement the number-wheels will not be turned, and in consequence the number last printed will be duplicated. In this operation, however, the finger or pawl 22 will engage with one of the teeth 28 of the alternate deep-toothed disk 15, so as to feed said disk forward one step, so that on the succeeding operation the finger or pawl 22 may engage within the space between two of the plates 27 to again operate the number-wheels.

It will be observed that the device is of a very simple construction, and the feeding-pawls being arranged exteriorly of the number wheels or disks the device can be constructed at a minimum cost.

Having now described our invention, what we claim as new, and desire to secure by Letters Patent, is as follows:

1. In a numbering-machine, the combination with a series of number-carrying disks or wheels, of a pawl-carrying plate arranged exteriorly of said disks or wheels, pawls on said plate engaging said disks or wheels for operating the latter, a finger or pawl carried by said plate arranged to prevent consecutive operation of the feed-pawls, an alternate deep-toothed disk arranged concentrically to the number-carrying wheels or disks and with which said finger coöperates, a lever pivoted to the pawl-carrying plate for engaging said finger with, and permitting disengagement of said finger from, the alternate deep-toothed disk, and a second finger pivoted to the pawl-carrying plate and with which said lever coöperates for throwing the feed-pawls continuously out of operation, substantially as set forth.

2. In a numbering-machine, the combination with a series of number-carrying disks or wheels, of a pawl-carrying plate arranged exteriorly of said disks or wheels, pawls on said plate engaging said disks or wheels for operating the latter, a finger or pawl carried by said plate arranged to prevent consecutive operation of the feed-pawls, an alternate deep-toothed disk arranged concentrically to the number-carrying wheels or disks and with which said finger coöperates, a lever pivoted to the pawl-carrying plate for engaging said finger with, and permitting disengagement of said finger from, the alternate deep-toothed disk, a second finger pivoted to the pawl-carrying plate and with which said lever coöperates for throwing the feed-pawls continuously out of operation, and a plain disk with which the second finger coöperates, substantially as set forth.

3. In a numbering-machine, the combination with a series of number-carrying disks or wheels, of a pawl-carrying plate arranged exteriorly of said disks or wheels, pawls on said plate engaging said disks or wheels for operating the latter, a finger or pawl carried by said plate arranged to prevent consecutive operation of the feed-pawls, an alternate deep-toothed disk arranged concentrically to the number-carrying wheels or disks and with which said finger coöperates, a lever pivoted to the pawl-carrying plate for engaging said finger with, and permitting disengagement of said finger from, the alternate deep-toothed disk, a second finger pivoted to the pawl-carrying plate and with which said lever coöperates for throwing the feed-pawls continuously out of operation, and a stationary plain disk with which the second finger coöperates, substantially as set forth.

This specification signed and witnessed this 20th day of July, 1900.

ALBERT P. WATERMAN.
GEO. H. E. BERTHOLD.

Witnesses to signature of Albert P. Waterman:
PETER WEBER,
J. F. RANDOLPH.

Witnesses to signature of George H. E. Berthold:
J. A. BOEHME,
FREDERICK C. DEVONALD.